(12) United States Patent
Kuscher et al.

(10) Patent No.: US 9,261,989 B2
(45) Date of Patent: *Feb. 16, 2016

(54) INTERACTING WITH RADIAL MENUS FOR TOUCHSCREENS

(75) Inventors: Alexander Friedrich Kuscher, San Francisco, CA (US); Stefan Kuhne, San Jose, CA (US)

(73) Assignee: Google Inc., Mountain View, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/615,226

(22) Filed: Sep. 13, 2012

(65) Prior Publication Data

US 2014/0071063 A1    Mar. 13, 2014

(51) Int. Cl.
*G06F 3/041*    (2006.01)
(52) U.S. Cl.
CPC ..................................... *G06F 3/041* (2013.01)
(58) Field of Classification Search
CPC ....... G06F 3/016; G06F 3/041; G06F 3/0488; G06F 3/04886; G06F 3/04883; G06F 3/0481; G06F 3/0482; G06F 2203/04807; G06F 3/04847
USPC .................... 345/173–179; 178/18.01–18.09; 715/702, 810, 816, 834
See application file for complete search history.

(56) References Cited

U.S. PATENT DOCUMENTS

| | | |
|---|---|---|
| 5,689,667 A | 11/1997 | Kurtenbach |
| 5,943,039 A | 8/1999 | Anderson et al. |
| 7,185,363 B1 | 2/2007 | Narin et al. |
| 7,382,268 B2 | 6/2008 | Hartman |
| 7,487,170 B2 | 2/2009 | Stevens |
| 7,603,435 B2 | 10/2009 | Welingkar et al. |
| 7,603,633 B2 | 10/2009 | Zhao et al. |
| 7,657,594 B2 | 2/2010 | Banga et al. |
| 7,697,942 B2 | 4/2010 | Stevens |

(Continued)

FOREIGN PATENT DOCUMENTS

| | | |
|---|---|---|
| CN | 101853123 A | 10/2010 |
| CN | 101916143 A | 12/2010 |

(Continued)

OTHER PUBLICATIONS

"WiFi Tethering", <http://www.appbrain.com/app/wifi-tethering/og.android.tether>, Open Garden Inc., visited Sep. 16, 2013, 1 pg.

(Continued)

*Primary Examiner* — Premal Patel
(74) *Attorney, Agent, or Firm* — McDermott Will & Emery LLP

(57) ABSTRACT

The subject technology discloses configurations for providing a radial menu on one or more computing devices with a touch-sensitive screen. In one example, a user activates the radial menu after touching a first finger at a first or anchor point on a touchscreen that serves as a center of the radial menu. While the first finger is disposed, the user then touches a second finger at a second point some distance from the anchor point corresponding to the first finger on the touchscreen. The radial menu is generated based on a distance calculated between the anchor point and the second finger at the second point. The radial menu is not a complete circle and instead displayed as a partial circle, and the radial menu is generated so that the display area is bisected from the anchor point to the second point in some configurations.

23 Claims, 8 Drawing Sheets

(56) References Cited

U.S. PATENT DOCUMENTS

| | | |
|---|---|---|
| 7,865,964 B2 | 1/2011 | Narin et al. |
| 8,077,153 B2 | 12/2011 | Benko et al. |
| 8,181,122 B2 | 5/2012 | Davidson |
| 8,526,885 B2 | 9/2013 | Lin et al. |
| 8,793,758 B2 | 7/2014 | Raleigh et al. |
| 2006/0095865 A1* | 5/2006 | Rostom .................. 715/810 |
| 2007/0008300 A1* | 1/2007 | Yang et al. .............. 345/173 |
| 2007/0174788 A1* | 7/2007 | Ording .................... 715/816 |
| 2007/0180392 A1 | 8/2007 | Russo |
| 2007/0256029 A1 | 11/2007 | Maxwell |
| 2008/0113665 A1 | 5/2008 | Paas et al. |
| 2008/0222569 A1 | 9/2008 | Champion et al. |
| 2008/0313538 A1 | 12/2008 | Hudson |
| 2008/0313569 A1 | 12/2008 | Aoki et al. |
| 2009/0033633 A1 | 2/2009 | Newman et al. |
| 2009/0037813 A1* | 2/2009 | Newman et al. .......... 715/702 |
| 2009/0260064 A1 | 10/2009 | McDowell et al. |
| 2009/0327963 A1 | 12/2009 | Mouilleseaux et al. |
| 2009/0327964 A1 | 12/2009 | Mouilleseaux et al. |
| 2010/0073303 A1* | 3/2010 | Wu et al. ................. 345/173 |
| 2010/0192102 A1 | 7/2010 | Chmielewski et al. |
| 2010/0192103 A1 | 7/2010 | Cragun et al. |
| 2010/0251179 A1 | 9/2010 | Cragun et al. |
| 2010/0251180 A1* | 9/2010 | Cragun et al. ............ 715/834 |
| 2010/0299637 A1 | 11/2010 | Chmielewski et al. |
| 2010/0299638 A1* | 11/2010 | Choi ....................... 715/835 |
| 2010/0306702 A1 | 12/2010 | Warner |
| 2011/0016390 A1 | 1/2011 | Oh et al. |
| 2011/0055760 A1 | 3/2011 | Drayton et al. |
| 2011/0069029 A1 | 3/2011 | Ryu et al. |
| 2011/0074718 A1 | 3/2011 | Yeh et al. |
| 2011/0113371 A1 | 5/2011 | Parker et al. |
| 2011/0148796 A1 | 6/2011 | Hollemans et al. |
| 2011/0231796 A1 | 9/2011 | Vigil |
| 2011/0234503 A1 | 9/2011 | Fitzmaurice et al. |
| 2011/0250909 A1 | 10/2011 | Mathias et al. |
| 2011/0283001 A1 | 11/2011 | Jung et al. |
| 2011/0294502 A1 | 12/2011 | Oerton |
| 2011/0302643 A1 | 12/2011 | Pichna et al. |
| 2012/0001858 A1 | 1/2012 | Matsuda et al. |
| 2012/0030070 A1 | 2/2012 | Keller et al. |
| 2012/0036434 A1* | 2/2012 | Oberstein ................. 715/702 |
| 2012/0056836 A1 | 3/2012 | Cha et al. |
| 2012/0144345 A1 | 6/2012 | Munter et al. |
| 2012/0240197 A1 | 9/2012 | Tran et al. |
| 2012/0254040 A1 | 10/2012 | Dixon et al. |
| 2012/0254142 A1 | 10/2012 | Knowlton et al. |
| 2012/0324067 A1 | 12/2012 | Hari et al. |
| 2013/0016126 A1 | 1/2013 | Wang et al. |
| 2013/0019175 A1 | 1/2013 | Kotler et al. |
| 2013/0019205 A1 | 1/2013 | Gil et al. |
| 2013/0176232 A1 | 7/2013 | Waeller |
| 2014/0075388 A1 | 3/2014 | Kuscher et al. |
| 2014/0078089 A1 | 3/2014 | Lee et al. |
| 2014/0123232 A1 | 5/2014 | Kuscher et al. |
| 2014/0137042 A1 | 5/2014 | Du et al. |

FOREIGN PATENT DOCUMENTS

| | | |
|---|---|---|
| CN | 102023786 A | 4/2011 |
| EP | 2503826 A1 | 9/2012 |
| JP | 2006-139615 A | 6/2006 |
| KR | 10-2011-0040087 | 4/2011 |
| WO | WO-2010/112064 A1 | 10/2010 |
| WO | WO-2011/101852 A2 | 8/2011 |

OTHER PUBLICATIONS

"Barnacle Wifi Tether", <http://www.appbrain.com/app/barnacle-wifi-tether/net.szym.barnacle>, szym.net, visited Sep. 16, 2013, 1 pg.

"My Wi on Demand", <http://www.intelliborn.com/mywiondemand.html>, Intelliborn Corporation, visited Sep. 16, 2013, 1 pg.

Sharma, Ashish, et al., "Cool-Tether: Energy Efficient On-the-fly WiFi Hot-sports Using Mobile Phones", CoNEXT, Dec. 2009, 12 pgs.

Iglesias, Jesus, "Blue Car Tethering on Demand", Dec. 1, 2014, 2 pgs.

* cited by examiner

INTERACTING WITH RADIAL MENUS FOR TOUCHSCREENS

BACKGROUND

The subject technology generally relates to graphical user interfaces involving a radial menu. The radial menu may be a circular menu configured to include a set of menu items corresponding to commands, functions or options that are activated upon selection within the radial menu.

SUMMARY

The subject technology provides for detecting an anchor point and a second point corresponding to a radial menu based on touch input on a touch-sensitive screen in which the radial menu includes a display area including one or more menu options; receiving a subsequent touch input on the touch-sensitive screen corresponding to the radial menu in which the subsequent touch input includes a gesture including an initial position corresponding to the detected second point and a third point corresponding to an end position of the gesture; determining if the third point corresponds to a sub-menu provided by the radial menu; and providing for display the sub-menu based on a distance between the second point and the anchor point plus an additional distance in which the sub-menu includes a second display area including one or more additional menu options.

The subject technology further provides for receiving a first touch input on a touch-sensitive screen for selecting a menu option provided in a radial menu in which the radial menu includes a display area including one or more menu options; determining whether automatic activation of the selected menu option is provided; and activating the selected menu option in response to automatic activation being provided.

Yet another aspect of the subject technology provides a system. The system includes memory, one or more processors, and one or more modules stored in memory and configured for execution by the one or more processors. The system includes a radial menu module configured to detect an anchor point and a second point corresponding to a radial menu based on touch input on a touch-sensitive screen in which the radial menu comprises a display area including one or more menu options. The system further includes a touch input module configured to receive a subsequent touch input on the touch-sensitive screen corresponding to the radial menu in which the subsequent touch input comprises a gesture including an initial position corresponding to the detected second point and a third point corresponding to an end position of the gesture, and determine if the third point corresponds to a sub-menu provided by the radial menu. Additionally, the system includes a graphical user interface (GUI) display module configured to provide for display the sub-menu based on a distance between the second point and the anchor point plus an additional distance in which the sub-menu includes a second display area including one or more additional menu options.

The subject technology further provides for detecting an anchor point and a second point corresponding to a radial menu based on touch input on a touch-sensitive screen in which the radial menu includes a display area including one or more menu options; receiving a subsequent touch input on the touch-sensitive screen corresponding to the radial menu in which the subsequent touch input includes a gesture including an initial position corresponding to the detected second point and a third point corresponding to an end position of the gesture; determining if the third point corresponds to a sub-menu provided by the radial menu; providing for display the sub-menu based on a distance between the second point and the anchor point plus an additional distance in which the sub-menu includes a second display area including one or more additional menu options; receiving additional touch input to select a menu option within the sub-menu in which the additional touch input includes a fourth point corresponding to an end position of the additional touch input; detecting a release of the fourth point to activate the selected menu option within the sub-menu; and activating the selected menu option in response to the detected release of the fourth point.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In some configurations, a radial menu is a circular menu configured to include a set of menu items corresponding to commands, functions or options that are activated upon selection within the radial menu. For instance, a radial menu is graphically depicted as a circle shape with respective segments dividing the circle shape. Each segment of the circle shape may be associated with a command, function or option for the radial menu. Computing devices with touch-sensitive screens are prevalent, such as mobile phones, tablet devices, etc. However, implementing a radial menu that is user-friendly on a computing device with a touch-sensitive screen ("touchscreen") is problematic. A typical radial menu includes an entire circle shape where segments may be obscured by a user's hand. Accessing portions of the radial menu may be difficult due to the positioning of the user's hand, the left or right handedness of the user, and other physical constraints. Further, the radial menu may not support interactions with the menu that accounts for different finger movements.

In view of the aforementioned issues, the subject technology provides configurations of a radial menu for a touchscreen on a computing device.

Figure 1:
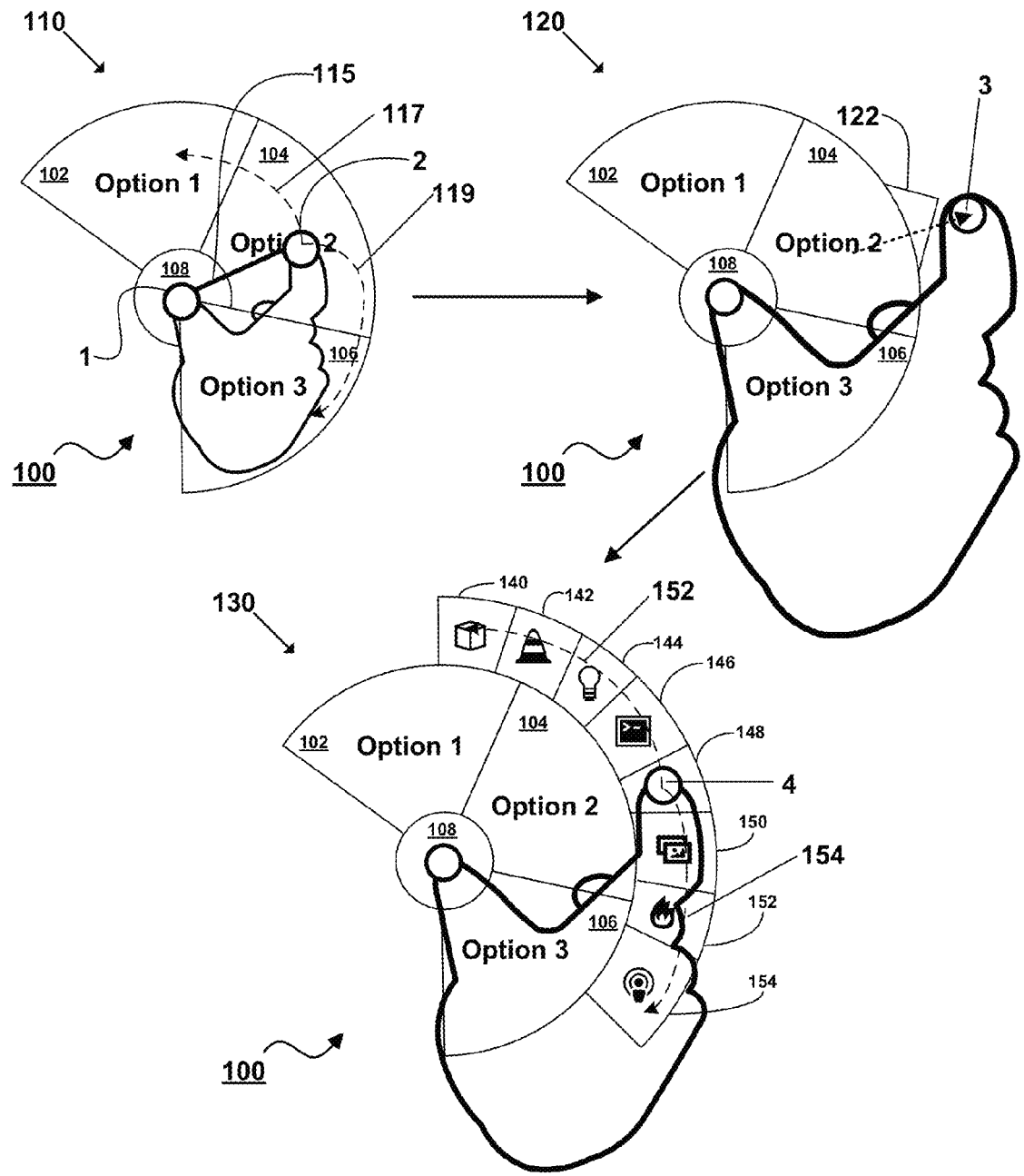
FIG. 1 conceptually illustrates a graphical user interface (GUI) for providing a radial menu in which some configurations of the subject technology can be implemented.

FIG. 1 conceptually illustrates a graphical user interface (GUI) 100 for providing a radial menu in which some configurations of the subject technology can be implemented. As illustrated in the example shown in FIG. 1, the GUI 100 corresponds to a radial menu that is provided for display. More specifically, the GUI 100 can include one or more display areas with different sets of graphical elements. A graphical element can include, but is not limited to, a button, check box, radio button, slider, list box, drop-down list, menu, combo box, icon, text box, scroll bar, etc. The GUI 100 illustrated in FIG. 1 may be provided on one or more computing devices or systems.

As illustrated in the example of FIG. 1, configurations of a radial menu for a touchscreen are shown in different stages 110, 120 and 130. The radial menu shown in the GUI 100 may be a contextual menu provided by an operating system and configured to accept touch input from a user to activate and enable interactions with the radial menu.

As shown in the stage 110, a user activates the radial menu after touching a first finger (e.g., a thumb) at a first or anchor point 1 on a touchscreen that serves as a center of the radial menu (e.g., serving as an initial anchor point). While still having the first finger disposed on the touchscreen, the user then touches a second finger at a second point 2 some distance from the anchor point 1 corresponding to the first finger on the touchscreen. The radial menu in the GUI 100 is generated based on a distance 115 calculated between the anchor point 1 (first finger) and the second finger at the second point 2. This distance 115 represents a radius of a circle shape that defines portions of the radial menu in the GUI 100. In this regard, the radial menu may be generated to a predetermined size to fill an area on the touchscreen according to the distance 115 between the anchor point 1 and the second point 2 (e.g., the radius). Notably, as shown in the example GUI 100, the radial menu is not a complete circle and instead displayed as a partial circle. In one example, the partial circle is generated to cover a display area equivalent to a portion of a circumference defined by the radius. Moreover, the radial menu is generated so that the display area is bisected from the anchor point 1 (first finger) to the second point 2 (second finger) as shown in the example of the GUI 100 in FIG. 1.

As further shown in the stage 110, an area of the radial menu may occupy a portion of the touchscreen so that one or more "pie" segments 102, 104 and 106 extend a distance equivalent to a predetermined portion of the radius from the second point 2 (e.g., position of the second finger), such as 20% of the radius as an example. Other percentages of the radius may be utilized and still be within the scope of the subject technology. This allows the user to be able to access portions of the radial menu without difficulty due to overextending or stretching the user's finger. Thus, the radial menu includes one or more "pie" segments or sectors that aggregately form a partial circle (e.g., a disk or region of a circle), which graphically represents the radial menu.

As an example, a circular sector or circle sector ("sector") is the portion of a disk enclosed by two radii and a circular arc. Each sector in the partial circle corresponds to respective menu items corresponding to menu options, commands, functions, etc., that may be in the form of text, icons, graphical elements, pictures, any mix of the aforementioned, etc., which are selectable via touch input. Further, a portion of the radial menu starting from the anchor point 1 (first finger) may be occupied by an empty inner concentric circle 108 that represents a portion of the radial menu completely absent of menu items/options. Other ways to display the radial menu in the GUI 100 can be provided and still be within the scope of the subject technology.

The above-mentioned radial menu is configured to receive touch input based on movement of the second finger and/or the first finger already disposed on the touchscreen of the computing device. For instance, while keeping the first finger disposed in the center of the radial menu, the user may rotate the his/her hand while swiping with the second finger according to path 117 and/or path 119 in order to select a respective menu option in the segments 102 or 106 provided in the radial menu. Similarly, the user may select segment 104 by moving the second finger within the segment 104. Upon selection, the radial menu may highlight (or perform another graphical indication) the selected menu option in order to indicate selection of the menu option. Subsequently, in some configurations, the user may lift or release the second finger from the touchscreen in order to activate the selected menu option.

In the stage 120, the user has moved the second finger from the second point 2 from the stage 110 to a third point 3 as shown. In some instances, the radial menu is configured to provide an additional sub-menu. In one example, the user may swipe or move the second finger to a portion of the radial menu that indicates that a sub-menu is available. The radial menu may provide a graphical indication of the availability of the sub-menu, such as displaying an additional graphical element 122 (e.g., a wedge shape or other shape). The user may then swipe the second finger outside of the additional graphical element 122 to the third point 3 to activate the sub-menu. Upon activation, the radial menu provides the sub-menu for display as shown in the stage 130.

In the stage 130, the sub-menu in some configurations is a portion of a concentric circle that extends beyond the radius of the initial radial menu that includes segments 102, 104 and 106. It is noted that the sub-menu does not have the same display area as the initial radial menu and covers a display area that is smaller in comparison to the initial radial menu. Within the sub-menu, one or more additional menu options may be provided. As shown, the example sub-menu includes segments 140, 142, 144, 146, 148, 150, 152, and 154 corresponding to respective menu options. The user may then select a menu option within the sub-menu in a similar manner described above for the radial menu. For instance, the user may move the second finger to a fourth point 4 as shown in the stage 130 in order to select a corresponding menu option in the segment 148. The sub-menu may highlight the selected segment 148 to indicate that this menu option is currently selected. In one example, the user may lift or release the second finger from the fourth point 4 in order to activate the selected segment 148. Similarly, the user may move the second finger along a path 152 or path 154 in order to select one of the segments 140, 142, 144, 146, 150, 152, or 154, and then lift or release the second finger to activate the selected segment. Additionally, to exit the sub-menu, the user may swipe the second finger back within the initial radial menu corresponding to the segments 102, 104 and 106.

In some configurations, as the user is moving the aforementioned second finger along one or more paths within the radial menu or the sub-menu, the GUI 100 may provide for display a graphical indication, such as a "glowing" arc, to indicate the path of the second finger on the touchscreen. As the second finger further moves along a corresponding path, the GUI 100 may provide another graphical indication, such as a dot or set of dots being displayed when a different menu option is newly selected by the second finger along with corresponding text for the newly selected menu option that appears alongside the dot(s). Other types of graphical indications may be provided and still be within the scope of the subject technology.

For the examples described in the GUI 100 of FIG. 1, the user may exit the radial menu by lifting (releasing) the first finger (e.g., thumb) from the anchor point, or by lifting both fingers substantially at the same time. Alternatively, if the user lifts the first finger, the radial menu may not be exited, thus allowing the user to still interact with the radial menu utilizing the second finger. Some configurations allow the user to exit the menu by moving both fingers entirely off the radial menu.

Although the example shown in the GUI 100 illustrates the radial menu in a particular arrangement, other types of arrangements for displaying the radial menu could be provided and still be within the scope of the subject technology. By way of example, the radial menu may be provided for display via a text representation or a pictogram (e.g., one or more symbols). Further, a representation of the radial menu may be displayed after a brief delay so that a user can quickly select or activate a menu option without looking at the radial menu (e.g., without requiring the radial menu to be displayed). Additionally, although the GUI 100 includes certain graphical elements, it should be understood that the GUI 100 is not required to include all graphical elements shown in FIG. 1. Moreover, the GUI 100 could include more graphical elements than shown in the example of FIG. 1.

Figure 2:
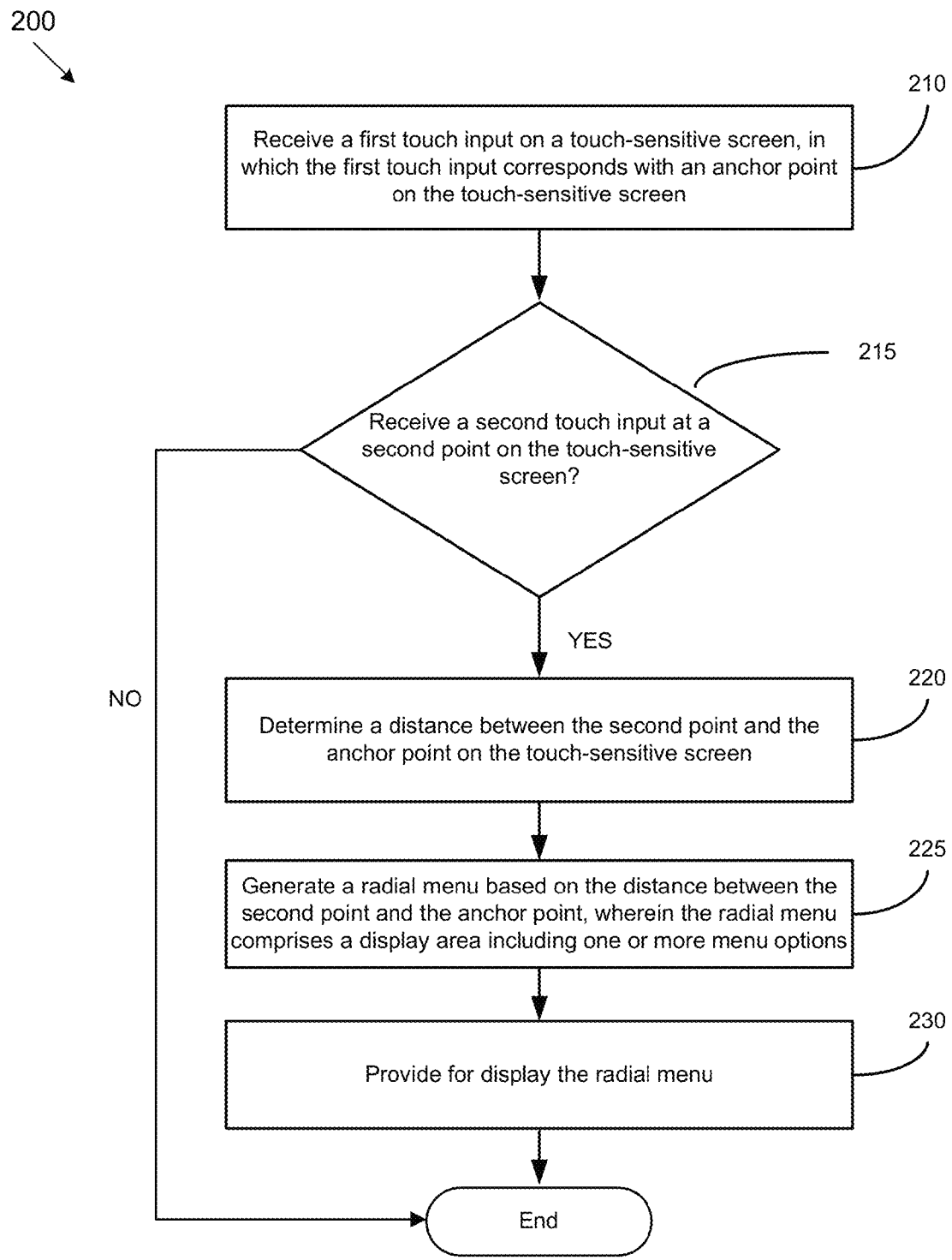
FIG. 2 conceptually illustrates an example process for providing a radial menu for display according to some configurations of the subject technology.

FIG. 2 conceptually illustrates an example process 200 for providing a radial menu for display according to some configurations of the subject technology. The process 200 can be performed on one or more computing devices or systems in some configurations. More specifically, the process 200 may be implemented to generate the radial menu as described in the example of FIG. 1.

The process 200 begins at 210 by receiving a first touch input on a touch-sensitive screen (e.g., touchscreen) in which the first touch input corresponds with an anchor point on the touch-sensitive screen. The anchor point in some instance will be utilized as a center for the radial menu.

The process 200 at 215 determines whether a second touch input at a second point on the touch-sensitive screen is received. The process 200 ends if no second touch input is received. If the second touch input is received at the second point on the touch-sensitive screen, then the process continues to 220.

The process 200 at 220 determines a distance between the second point and the anchor point on the touch-sensitive screen. In some configurations, the distance between the second point and the anchor point defines a radius of a circle utilized for generating the display area of the radial menu.

The process 200 at 225 generates a radial menu based on the distance between the second point and the anchor point. In some configurations, the radial menu includes a display area including one or more menu options. The display area includes respective graphical segments corresponding to the one or more menu options in one example. Further, the display area of the radial menu includes a circular sector of the circle utilized for generating the display area. As an example, the circular sector comprises a portion of the circle based on a predetermined arc and the radius of the circle, and the arc is an angle defined by a vertex based on the anchor point. The display area of the radial menu, in one example, may be bisected from a line from the anchor point to the second point.

The process 200 at 230 provides for display the radial menu. For instance, the radial menu may be displayed as illustrated in the example GUI 100 of FIG. 1. The process 200 then ends.

Figure 3:
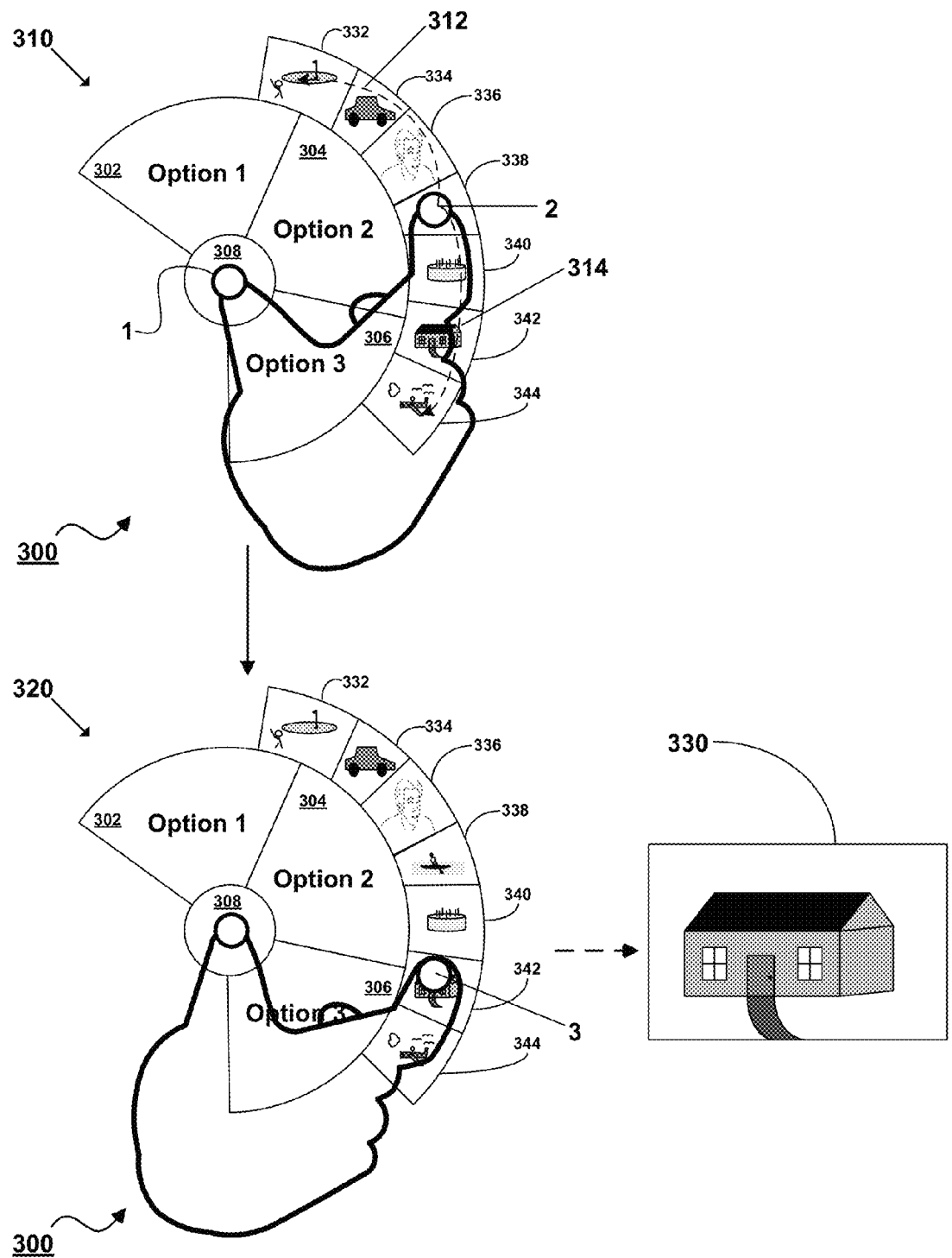
FIG. 3 conceptually illustrates a graphical user interface (GUI) for providing a radial menu in which some configurations of the subject technology can be implemented.

FIG. 3 conceptually illustrates a graphical user interface (GUI) 300 for providing a radial menu in which some configurations of the subject technology can be implemented. As illustrated in the example shown in FIG. 3, the GUI 300 for a radial menu is provided for display, which is similar to the GUI 100 described in FIG. 1. More specifically, the GUI 300 can include one or more display areas with different sets of graphical elements. The GUI 300 illustrated in FIG. 3 may be provided on one or more computing devices or systems.

As illustrated in the example of FIG. 3, the GUI 300 includes a radial menu with a sub-menu including multiple menu options. Different interactions may be provided by the GUI 300 depending on the type of user input received. For instance, one or more menu options within the sub-menu may be automatically activated without requiring the user to lift the second finger. For instance, an example application may allow an automatic setting of the operating system's desktop background by having the user swipe through graphical thumbnails of respective wallpapers provided in menu options of the sub-menu. Similarly, another example application may include an application switcher that automatically switches to open applications as the user swipes through corresponding menu options of open applications within the sub-menu. Automatic activation of selected menu options may also be applied for menu options provided in the initial radial menu in a similar manner. Other types of interactions may be provided and still be within the scope of the subject technology.

As illustrated in the example of FIG. 3, configurations of a radial menu for a touchscreen on a computing device are shown in different stages 310 and 320 for interacting with a sub-menu included in the radial menu. The radial menu and sub-menu shown in the GUI 300 may be a contextual menu that is provided by an operating system and configured to accept touch input from a user to activate and enable interactions with the radial menu and/or sub-menu. Further, the GUI 300 may be provided for display in the manner described in FIGS. 1 and 2. In particular, the radial menu in the GUI 300 is generated based on a distance calculated between an anchor point 1 (first finger) and the second finger at a second point 2 shown in FIG. 3.

As shown in the stage 310, an area of the radial menu may occupy a portion of the touchscreen including one or more "pie" segments 302, 304 and 306. Thus, the radial menu includes one or more "pie" segments or sectors that aggregately form a partial circle (e.g., a disk or region of a circle), which graphically represents the radial menu (similar to the GUI 100 described in FIG. 1). Further, a portion of the radial menu starting from the anchor point 1 (first finger) may be occupied by an empty inner concentric circle 308 that represents a portion of the radial menu completely absent of menu items/options. Other ways to display the radial menu in the GUI 300 can be provided and still be within the scope of the subject technology.

As further shown in the stage 310, the sub-menu in some configurations is a portion of a concentric circle that extends beyond the radius of the initial radial menu corresponding to segments 302, 304 and 306. As mentioned before, the sub-menu does not have the same display area as the initial radial menu and covers a display area that is smaller in comparison to the initial radial menu in one example. Within the sub-menu, one or more additional menu options may be provided. As shown, the example sub-menu includes segments 332, 334, 336, 338, 340, 342, and 344 corresponding to respective menu options. In the example of FIG. 3, each of the segments corresponds to a respective graphical image (e.g., thumbnail image), which may be utilized for different purposes upon being selected, including automatically setting a user's desktop picture, or automatically providing the respective graphical image for display as part of a slideshow presentation, etc. The user may select a particular graphical image within the sub-menu by move the second finger along a path 312 or path 314 in order to select one of the segments 332, 334, 336, 338, 340, 342, and 344, without lifting or releasing the second finger to activate the selected segment.

In the stage 320 of the example of FIG. 3, the user has moved the second finger to a third point 3 in order to select the graphical image corresponding to the segment 342. Upon selection, the graphical image is automatically provided for display in image 330 (e.g., slideshow or user's desktop) without requiring the user to lift the second finger in order to activate the selected segment 342. In this manner, the example GUI 300 in FIG. 3 is able to provide automatic activation of a selected segment corresponding to a menu option, graphical image, etc., provided in the sub-menu of the radial menu.

Although the example in FIG. 3 describes an application for automatically providing selected graphical images corresponding to a selected segment within the sub-menu, other types of applications or utilizations may be provided and still be within the scope of the subject technology. As mentioned before, the sub-menu may include one or more segments respectively corresponding to one or more currently executing applications. In this regard, the user may then select one of the segments in the sub-menu to switch to one of the currently executing applications (e.g., task/application switching).

Figure 4:
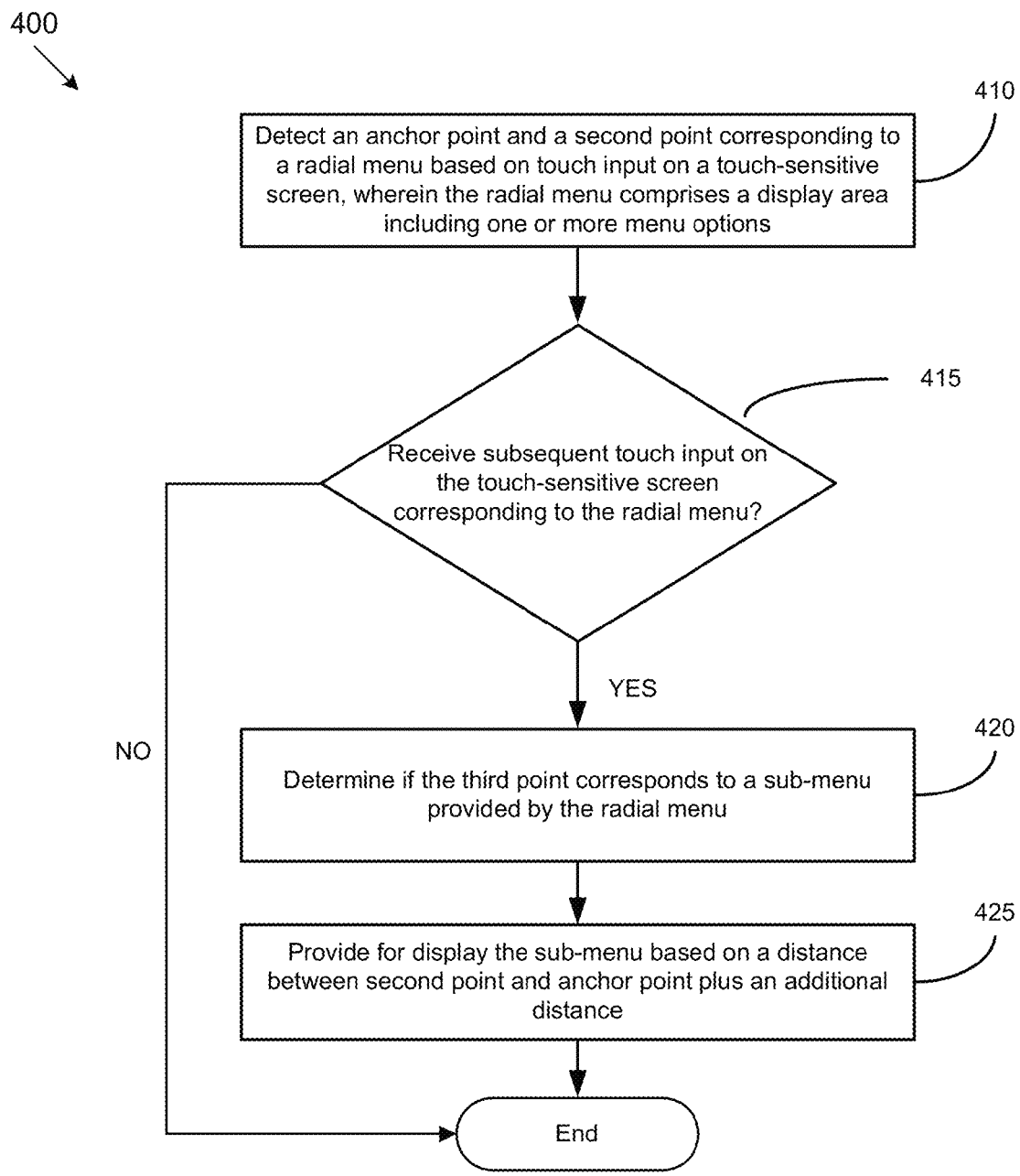
FIG. 4 conceptually illustrates an example process for providing a sub-menu for a radial menu in some configurations.

FIG. 4 conceptually illustrates an example process 400 for providing a sub-menu for a radial menu in some configurations. The process 400 can be performed by one or more computing devices or systems in some configurations. For instance, the process 400 may be executed by one or more computing devices in order to provide a sub-menu as described in FIGS. 1 and 3.

The process 400 begins at 410 by detecting an anchor point and a second point corresponding to a radial menu based on touch input on a touch-sensitive screen. The anchor point may correspond with a position of a first finger, and the second point may correspond with a position of a second finger (e.g., as illustrated in FIG. 1 or FIG. 3). In one example, the radial menu includes a display area including one or more menu options. In some configurations, the display area of the radial menu includes a portion of a circle defined by a radius based on the distance from the anchor point and the second point.

The process 400 at 415 determines whether a subsequent touch input is received on the touch-sensitive screen corresponding to the radial menu. The subsequent touch input may be a gesture including an initial position corresponding to the detected second point and a third point corresponding to an end position of the gesture. If no subsequent touch input is received, the process 400 then ends. Alternatively, upon determining that subsequent touch input is received, the process 400 continues to 420. Referring to the stage 120 shown in FIG. 1, in some configurations, the radial menu may indicate that a particular sub-menu is available (e.g., via displaying a graphical element such as a wedge) for a menu option provided in the radial menu. In this regard, the user may activate the sub-menu by moving the second finger to a position outside of the radial menu.

The process 400 at 420 determines if the third point corresponds to a sub-menu provided by the radial menu. In one example, the third point corresponds with a position outside of the radial menu (e.g., as shown in the stage 120 of FIG. 1). The third point may be within a predetermined distance from a graphical element that indicates an availability of the sub-menu (e.g., a wedge shape).

The process 400 at 425 provides for display the sub-menu based on a distance between the second point and the anchor point plus an additional distance. In one example, the sub-menu includes a display area including one or more additional menu options. The display area of the sub-menu includes a portion of a concentric circle that extends from a portion of the radial menu defined by a partial circumference based the radius in some configurations. As an example, the display area of the sub-menu includes an arc defined by a vertex based on the anchor point. Other ways to display the sub-menu may be provided and still be within the scope of the subject technology. The process 400 then ends.

Figure 5:
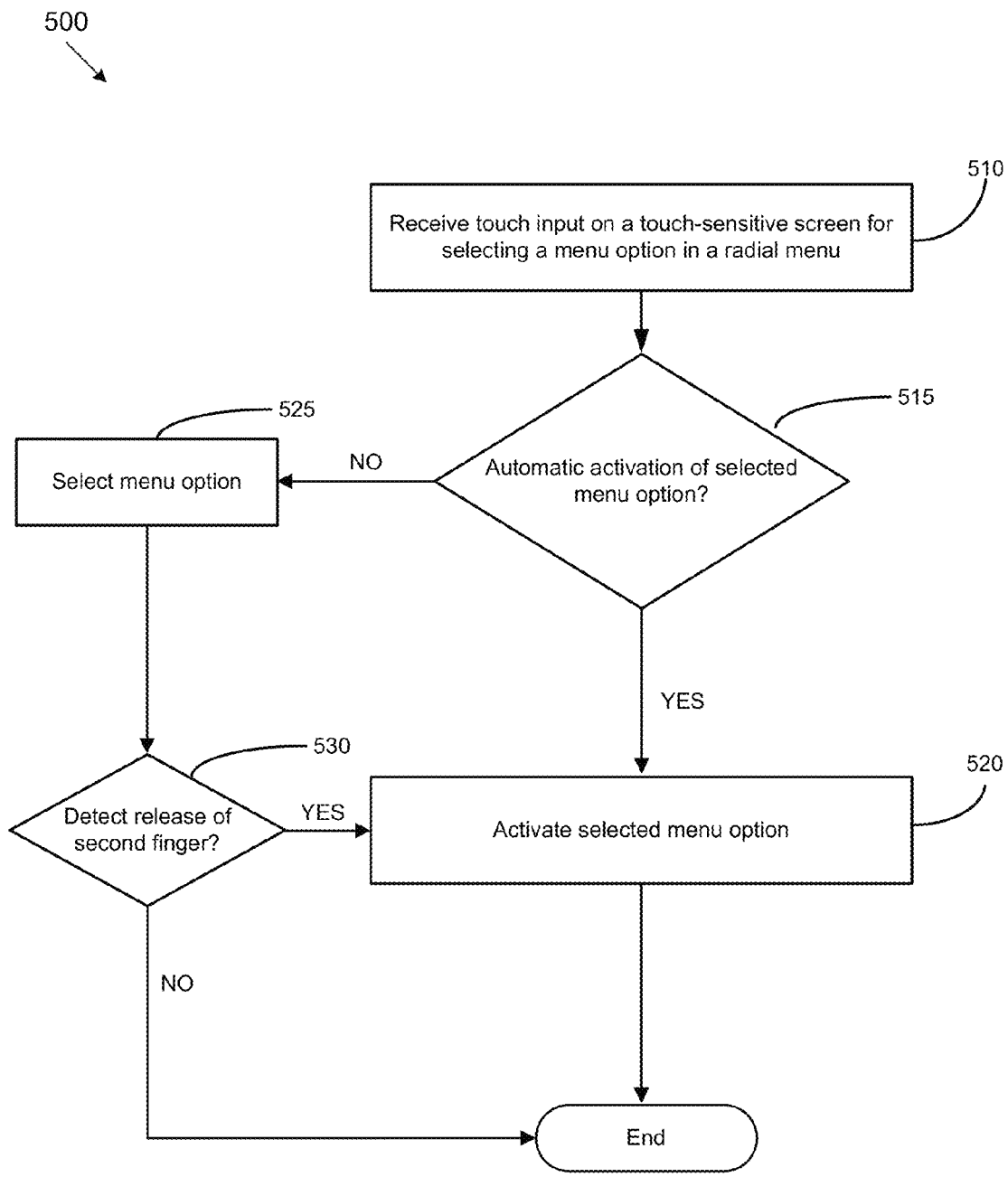
FIG. 5 conceptually illustrates an example process selecting and/or activating a selected menu option in a radial menu according to some configurations.

FIG. 5 conceptually illustrates an example process 500 selecting and/or activating a selected menu option in a radial menu according to some configurations. The process 500 can be performed by one or more computing devices or systems in some configurations.

As described before, a radial menu corresponds to an anchor point (first finger) and a second point (second finger) on a touch-sensitive screen. The distance between the second point and the anchor point defines a radius of a circle utilized for generating the display area of the radial menu. Further, the radial menu may provide a sub-menu including additional menu options for selection. In order to select a menu option provided in either the radial menu or the sub-menu, touch input may be received from a second finger that includes a gesture from an initial position corresponding to a point within the radial menu or sub-menu to a different point, corresponding to an end position of the gesture, within the radial menu or sub-menu.

The process 500 at 510 receives a touch input on a touch-sensitive screen for selecting a menu option provided in a radial menu (or sub-menu provided in the radial menu). The received touch input may correspond with input received from a second finger while a first finger is disposed on the touch-sensitive screen at the anchor point. In some configurations, the received touch input may correspond with a user moving a second finger along a path to select a respective menu option provided in a radial menu (e.g., as illustrated in the stage 110 in FIG. 1). Alternatively, the received touch input may correspond with the user moving the second finger along a path to select a respective menu option provided in a sub-menu of the radial menu (e.g., as illustrated in the stage 130 of FIG. 1 or FIG. 3). In this regard, the received touch input from the second finger includes a point indicating an end position of the touch input that corresponds to the selected menu option.

The process 500 at 515 determines whether automatic activation of the selected menu option is provided. If so, the process 500 continues to 520 to activate the selected menu option. The selected menu option may be activated, for example, by automatically executing a command, function, and/or a set of operations, launching or switching to an application corresponding to the selected menu option, etc. In this manner, the selected menu option is automatically activated without requiring the user to lift or release the second finger to initiate the activation.

Alternatively, if the process 500 determines that automatic activation is not provided or absent for the selected menu option, the process 500 continues to 525 to select the selected menu option. In one example, the process 500 may provide a graphical indication that the menu option is selected such as highlighting the menu option or another similar graphical indication, etc.

The process 500 then continues to 530 to detect whether the aforementioned second finger is released. As described above, the second finger may provide touch input (e.g., a gesture) including the end position of the touch input at a particular point corresponding to the selected menu option. If the second finger is detected as being released, the process 500 continues to 520 to activate the selected menu option. Alternatively, if the second finger is not detected as being released at 530, the process 500 then ends.

Figure 6A:
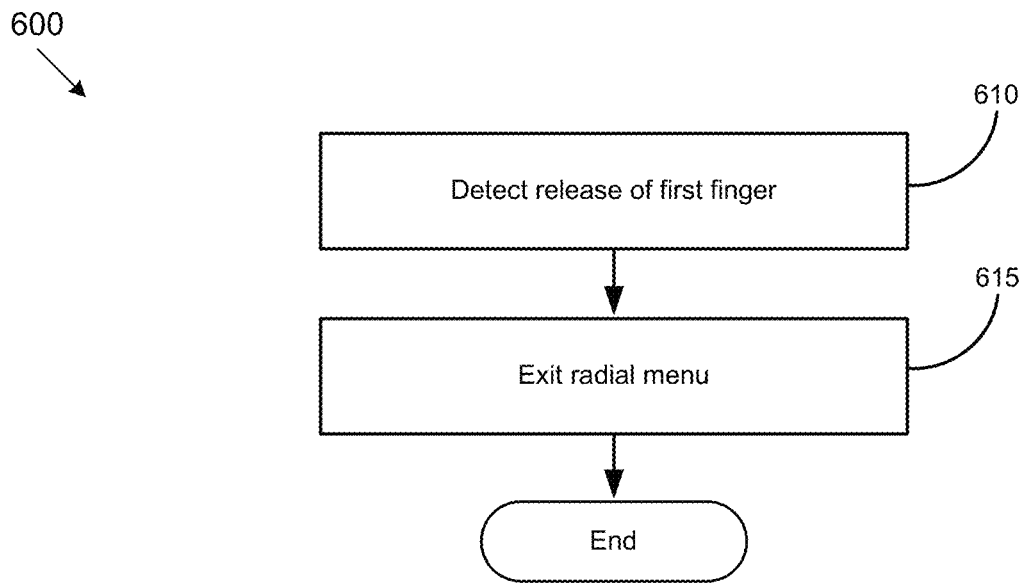
FIGS. 6A and 6B conceptually illustrates example processes for exiting a radial menu according to some configurations.
Figure 6B:
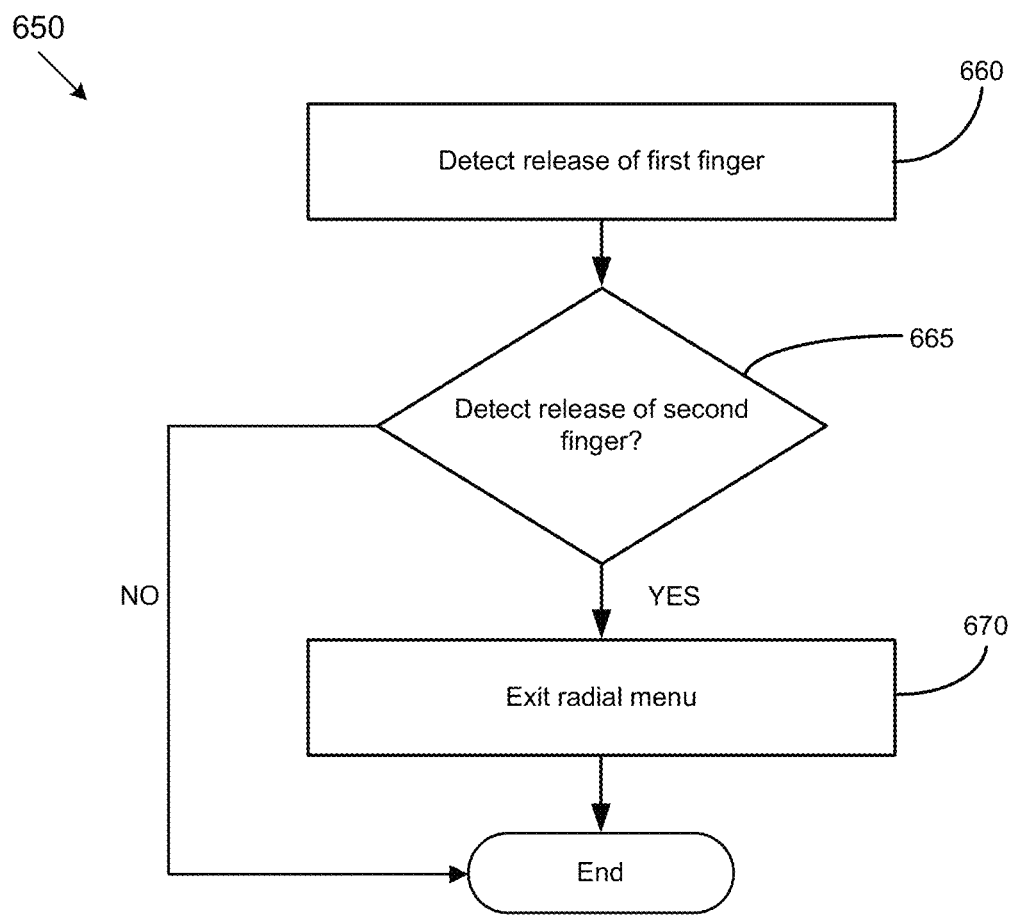

FIGS. 6A and 6B conceptually illustrates example processes 600 and 650 for exiting a radial menu according to some configurations. The processes 600 and 650 can be performed by one or more computing devices or systems in some configurations.

As described before, a radial menu corresponds to an anchor point (first finger) and a second point (second finger) on a touch-sensitive screen. Further, the radial menu may provide a sub-menu including additional menu options for selection. Configurations of the radial menu may provide different ways for exiting the radial menu as illustrated in the examples of FIGS. 6A and 6B. Exiting the radial menu may be understood as performing one or more operations for closing the radial menu so that the radial menu is not provided for display. In this manner, a user may stop utilizing the radial menu or cancel an action within the radial menu. The following description assumes that the radial menu is already provided for display with a first finger and second finger currently disposed at respective points on the touch-sensitive screen.

In some configurations, the radial menu may be exited by releasing the first finger as shown in the example process 600 of FIG. 6A. The process 600 begins at 610 by detecting a release of a first finger. In some configurations, a position of the first finger corresponds to an anchor point of the radial menu. At 615, the radial menu is exited in response to the first finger being released. The process 600 then ends.

Alternatively, the radial menu may be exited by releasing the first and second fingers as shown in the example process 650 in FIG. 6B. The process 650 begins at 660 by detecting a release of a first finger. In some configurations, a position of the first finger corresponds to an anchor point of the radial menu. In this example, the radial menu does not immediately exit upon a release of the first finger. Thus, the user may still interact with the radial menu by utilizing a second finger to move within the radial menu or within a sub-menu of the radial menu. The process 650 at 670 then determines if a release of a second finger corresponding to a point on the touch-sensitive screen is detected. If so, the process 650 continues to 670 to exit the radial menu. The process 650 then ends.

Other ways to exit the radial menu may be provided and still be within the scope of the subject technology. In one example, the user may move the respective positions of the first and second fingers entirely off the display area of the radial menu in order to exit the radial menu. For instance, the user may perform a gesture (e.g., swiping) that moves the first and second fingers completely away from the radial menu. Upon detecting that neither the first nor second fingers are within the display area of the radial menu, the radial menu is then exited.

Figure 7:
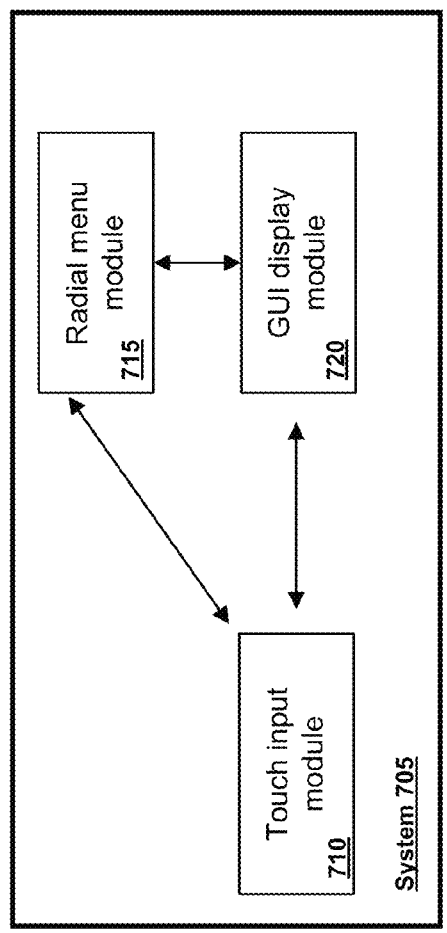
FIG. 7 conceptually illustrates an example computing environment including a system.

FIG. 7 conceptually illustrates an example computing environment 700 including a system. In particular, FIG. 7 shows a system 705 for implementing the above described GUI in FIGS. 1 and 3 and the processes in FIGS. 2, 4, 5, 6A and 6B. In some configurations, the system 705 is part of an implementation running a particular machine (e.g., client computer, laptop, notebook, netbook, etc.).

The system 705 can include memory, one or more processors, and one or more modules stored in memory and configured for execution by the one or more processors. As shown in FIG. 7, the system 705 includes several modules for providing different functionality. The system 705 is configured to include a touch input module 710, a radial menu module 715 and a graphical user interface (GUI) display module 720.

The touch input module 710 is configured to receive a first touch input on a touch-sensitive screen in which the first touch input corresponds with an anchor point on the touch-sensitive screen, receive a second touch input at a second point on the touch-sensitive screen, and determine a distance between the second point and the anchor point on the touch-sensitive screen. The distance between the second point and the anchor point defines a radius of a circle utilized for generating the display area of the radial menu.

The radial menu module 715 is configured to generate a radial menu based on the distance between the second point and the anchor point in which the radial menu includes a display area including one or more menu options. The display area includes respective graphical segments corresponding to the one or more menu options. The respective graphical segments extend a distance equivalent to a predetermined portion of the radius from the second point. The predetermined portion of the radius from the second point comprises twenty percent of the radius. In some configurations, the display area of the radial menu includes a circular sector of the circle utilized for generating the display area. In this regard, the circular sector includes a portion of the circle based on a predetermined arc and the radius of the circle, and the arc includes an angle defined by a vertex based on the anchor point. Further, the radial menu include an empty inner concentric circle that represents a portion of the radial menu completely absent of menu options. The aforementioned one or more menu options include at least one of text, icons, graphical elements, or pictures, etc.

The GUI display module 720 is configured to provide for display the radial menu. The radial menu is displayed as a partial circle in some configurations. In this regard, the partial circle is displayed to cover a display area equivalent to a portion of a circumference defined by a radius based on the distance between the second point and the anchor point.

Additionally, the radial menu module 715 is configured to detect an anchor point and a second point corresponding to a radial menu based on touch input on a touch-sensitive screen. The touch input module 710 is further configured to receive a subsequent touch input on the touch-sensitive screen corresponding to the radial menu in which the subsequent touch input comprises a gesture including an initial position corresponding to the detected second point and a third point corresponding to an end position of the gesture, and determine if the third point corresponds to a sub-menu provided by the radial menu. The GUI display module 720 is configured to provide for display the sub-menu based on a distance between the second point and the anchor point plus an additional distance in which the sub-menu comprises a second display area including one or more additional menu options. In some configurations, the second display area of the sub-menu comprises a portion of a concentric circle that extends from a portion of the radial menu defined by a partial circumference based the radius. Additionally, the second display area of the sub-menu comprises an arc defined by a vertex based on the anchor point.

The touch input module 710 is further configured to receive additional touch input to select a menu option within the sub-menu, wherein the additional touch input comprises a fourth point corresponding to an end position of the additional touch input. The radial menu module 715 is further configured to detect a release of the fourth point to activate the selected menu option within the sub-menu, and activate the selected menu option in response to the detected release of the fourth point.

Further, the radial menu module 715 is further configured to detect a release of both the first and second points to exit the radial menu. Alternatively, the radial menu module 715 is further configured to detect a release of the first point to exit the sub-menu.

As further shown in FIG. 7, each of the aforementioned modules can be configured to communicate between each other. For instance, different data, messages, API calls and returns can be passed between the different modules in the system 705.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

The following description describes an example system in which aspects of the subject technology can be implemented.

Figure 8:
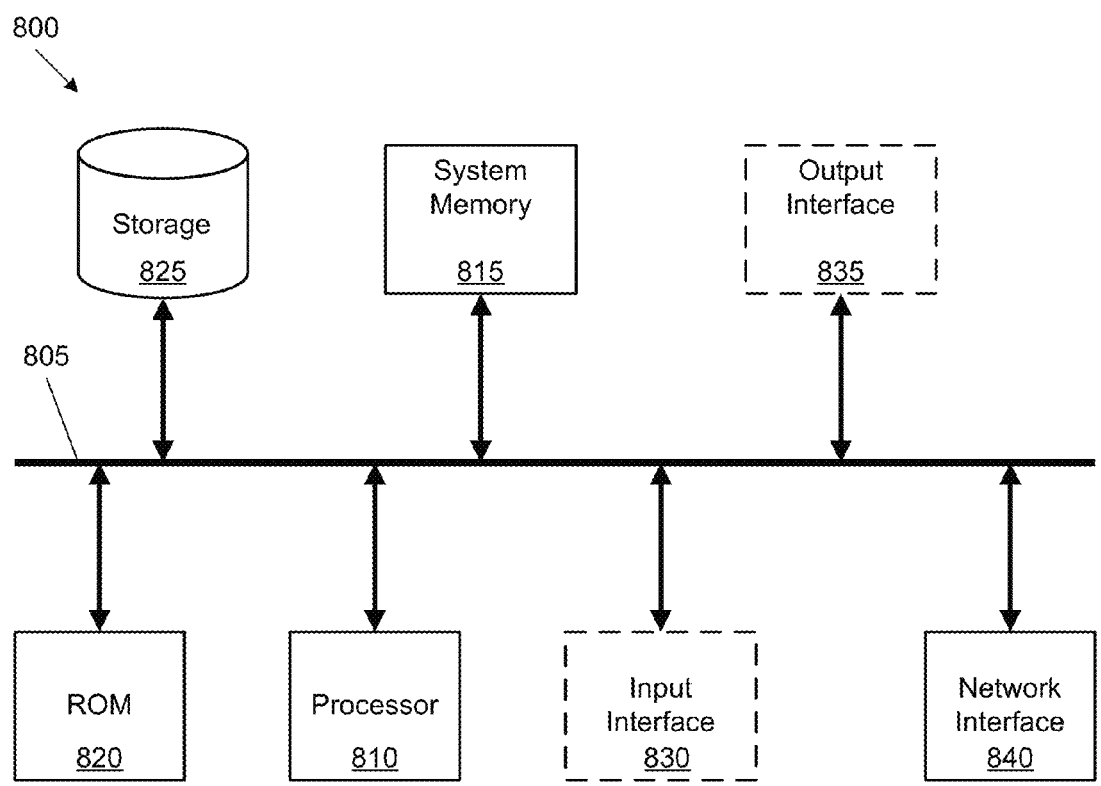
FIG. 8 conceptually illustrates a system with which some implementations of the subject technology may be implemented.

FIG. 8 conceptually illustrates a system 800 with which some implementations of the subject technology can be implemented. The system 800 can be a computer, phone, PDA, or another sort of electronic device. In some configurations, the system 800 includes a television with one or more processors embedded therein. Such a system includes various types of computer readable media and interfaces for various other types of computer readable media. The system 800 includes a bus 805, processing unit(s) 810, a system memory 815, a read-only memory 820, a storage device 825, an optional input interface 830, an optional output interface 835, and a network interface 840.

The bus 805 collectively represents all system, peripheral, and chipset buses that communicatively connect the numerous internal devices of the system 800. For instance, the bus 805 communicatively connects the processing unit(s) 810 with the read-only memory 820, the system memory 815, and the storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the system 800. The storage device 825, on the other hand, is a read-and-write memory device. This device is a non-volatile memory unit that stores instructions and data even when the system 800 is off. Some implementations of the subject technology use a mass-storage device (such as a magnetic or optical disk and its corresponding disk drive) as the storage device 825.

Other implementations use a removable storage device (such as a flash drive, a floppy disk, and its corresponding disk drive) as the storage device 825. Like the storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the subject technology's processes are stored in the system memory 815, the storage device 825, and/or the read-only memory 820. For example, the various memory units include instructions for processing multimedia items in accordance with some implementations. From these various memory units, the processing unit(s) 810 retrieves instructions to execute and data to process in order to execute the processes of some implementations.

The bus 805 also connects to the optional input and output interfaces 830 and 835. The optional input interface 830 enables the user to communicate information and select commands to the system. The optional input interface 830 can interface with alphanumeric keyboards and pointing devices (also called "cursor control devices"). The optional output interface 835 can provide display images generated by the system 800. The optional output interface 835 can interface with printers and display devices, such as cathode ray tubes (CRT) or liquid crystal displays (LCD). Some implementations can interface with devices such as a touchscreen that functions as both input and output devices.

Finally, as shown in FIG. 8, bus 805 also couples system 800 to a network interface 840 through a network adapter (not shown). In this manner, the computer can be a part of a network of computers (such as a local area network ("LAN"), a wide area network ("WAN"), or an Intranet, or an interconnected network of networks, such as the Internet. The components of system 800 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." An aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
   detecting an anchor point and a second point based on touch input on a touch-sensitive screen, wherein the second point is detected from a separate touch input on a separate portion of the touch-sensitive screen than the anchor point;
   displaying, in response to detecting the anchor point and the second point, a radial menu having a display area shaped as a sector of a circle, the sector of the circle having a center point at the anchor point and the second point lying on a perimeter of the sector of the circle;
   receiving a subsequent touch input on the touch-sensitive screen corresponding to the radial menu, wherein the subsequent touch input comprises a gesture including an initial position corresponding to the detected second point and a third point corresponding to an end position of the gesture, wherein the third point is separate from the second point and the anchor point;
   determining if the third point corresponds to a sub-menu provided by the radial menu; and
   providing for display the sub-menu based on a distance between the second point and the anchor point plus an additional distance, wherein the sub-menu comprises a second display area including one or more additional menu options.

2. The method of claim 1, wherein a radius of the sector of the circle is defined by a line from the anchor point and the second point.

3. The method of claim 2, wherein the second display area of the sub-menu comprises a portion of a concentric circle that extends from a portion of the radial menu defined by a partial circumference based the radius.

4. The method of claim 3, wherein second display area of the sub-menu comprises an arc defined by a vertex based on the anchor point.

5. The method of claim 1, further comprising:
   receiving additional touch input to select a menu option within the sub-menu, wherein the additional touch input comprises a fourth point corresponding to an end position of the additional touch input.

6. The method of claim 5, further comprising:
   detecting a release of the fourth point to activate the selected menu option within the sub-menu.

7. The method of claim 6, further comprising:
   activating the selected menu option in response to the detected release of the fourth point, wherein another menu option is activatable by another touch input prior to detecting release of the another touch input.

8. The method of claim 1, further comprising:
   detecting a release of both the anchor point and the second point to exit the radial menu.

9. The method of claim 1, further comprising:
   detecting a release of the anchor point to exit the sub-menu.

10. A computer-implemented method, the method comprising:
    receiving a first touch input on a touch-sensitive screen for selecting a menu option provided in a radial menu, wherein the radial menu comprises a display area including one or more menu options, while simultaneously receiving a second touch input corresponding to an anchor point of the radial menu, the second touch input being separate from the first touch input, the radial menu being shaped as a sector of a circle having a radius defined by a line from the anchor point to a second point;
    determining whether automatic activation of the selected menu option is provided; and
    activating the selected menu option when automatic activation is provided, wherein the same selected menu option is not activated when automatic activation is not provided.

11. The method of claim 10, wherein the first touch input comprises a gesture including an initial position corresponding to the second point and a third point corresponding to an end position of the gesture.

12. The method of claim 10, wherein the first touch input corresponds to input received from a second finger while a first finger is disposed on the touch-sensitive screen at the anchor point.

13. The method of claim 12, further comprising:
    indicating a selection of the selected menu option if automatic activation of the selected menu option is absent;
    detecting a release of the first touch input corresponding to a position of the second finger; and
    activating the selected menu option in response to detecting the release of the first touch input.

14. The method of claim 10, wherein the one or more menu options of the display area comprise a plurality of menu options of the display area and automatic activation is individually configurable for each of the plurality of menu options.

15. A device comprising:
- at least one processor circuit configured to:
  - detect an anchor point and a second point corresponding to a radial menu based on touch input on a touch-sensitive screen, wherein the radial menu comprises a display area including one or more menu options, the second point is separate from the anchor point, the display area comprises a partial circle having a center point at the anchor point, and the second point lies on a circumference of the partial circle;
  - receive a subsequent touch input on the touch-sensitive screen corresponding to the radial menu, wherein the subsequent touch input comprises a gesture including an initial position corresponding to the detected second point and a third point corresponding to an end position of the gesture, and determine if the third point corresponds to a sub-menu provided by the radial menu; and
  - provide for display the sub-menu based on a distance between the second point and the anchor point plus an additional distance, wherein the sub-menu comprises a second display area including one or more additional menu options.

16. The device of claim 15, wherein a radius of the partial circle is defined by a line between the anchor point and the second point.

17. The device of claim 16, wherein the second display area of the sub-menu comprises a portion of a concentric circle that extends from a portion of the radial menu defined by a partial circumference based the radius.

18. The device of claim 17, wherein second display area of the sub-menu comprises an arc defined by a vertex based on the anchor point.

19. The device of claim 15, wherein the at least one processor circuit is further configured to receive additional touch input to select a menu option within the sub-menu, wherein the additional touch input comprises a fourth point corresponding to an end position of the additional touch input.

20. The device of claim 19, wherein the at least one processor circuit is further configured to detect a release of the fourth point to activate the selected menu option within the sub-menu, and activate the selected menu option in response to the detected release of the fourth point.

21. The device of claim 15, wherein the at least one processor circuit is configured to detect a release of both the anchor and second points to exit the radial menu.

22. The device of claim 15, wherein the at least one processor circuit is configured to detect a release of the anchor point to exit the sub-menu.

23. A non-transitory machine-readable medium comprising instructions stored therein, which when executed by a machine, cause the machine to perform operations comprising:
- providing, for display on a touch-sensitive screen, a radial menu comprising a display area including one or more menu options, wherein a size of the radial menu is based at least in part on a distance from a first touch input being provided on the touch-sensitive screen to a second touch input being simultaneously provided on the touch-sensitive screen, the first touch input corresponding to an anchor point and the second touch input corresponding to a second point;
- receiving a subsequent touch input on the touch-sensitive screen corresponding to the radial menu, wherein the subsequent touch input comprises a gesture including an initial position corresponding to the detected second point and a third point corresponding to an end position of the gesture;
- determining if the third point corresponds to a sub-menu provided by the radial menu;
- providing for display the sub-menu based on a distance between the second point and the anchor point plus an additional distance, wherein the sub-menu comprises a second display area including one or more additional menu options;
- receiving additional touch input to select a menu option within the sub-menu, wherein the additional touch input comprises a fourth point corresponding to an end position of the additional touch input;
- detecting a release of the fourth point to activate the selected menu option within the sub-menu; and
- activating the selected menu option in response to the detected release of the fourth point.

* * * * *